(12) United States Patent
Jiang et al.

(10) Patent No.: US 10,665,183 B2
(45) Date of Patent: May 26, 2020

(54) SUB-PIXEL UNIT AND METHOD OF CONTROLLING THE SAME, PIXEL UNIT, ARRAY SUBSTRATE, DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Liangliang Jiang, Beijing (CN); Quan Gan, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/757,286
(22) PCT Filed: Jul. 20, 2017
(86) PCT No.: PCT/CN2017/093658
§ 371 (c)(1),
(2) Date: Mar. 2, 2018
(87) PCT Pub. No.: WO2018/129898
PCT Pub. Date: Jul. 19, 2018

(65) Prior Publication Data
US 2018/0357968 A1 Dec. 13, 2018

(30) Foreign Application Priority Data
Jan. 10, 2017 (CN) .......................... 2017 1 0017676

(51) Int. Cl.
*G09G 3/36* (2006.01)
*G02F 1/1343* (2006.01)
(Continued)

(52) U.S. Cl.
CPC ..... *G09G 3/3607* (2013.01); *G02F 1/133707* (2013.01); *G02F 1/133753* (2013.01);
(Continued)

(58) Field of Classification Search
CPC ................ G09G 3/3655; G09G 3/3233; G02F 1/133753; G02F 1/133555
(Continued)

(56) References Cited

U.S. PATENT DOCUMENTS 9,116,394 B2 8/2015 Chung et al.
9,804,433 B2 10/2017 Song et al.
(Continued)

FOREIGN PATENT DOCUMENTS

CN 102629056 A 8/2012
CN 102778791 A 11/2012
(Continued)

OTHER PUBLICATIONS

International Search Report and Written Opinion dated Oct. 20, 2017, for corresponding PCT Application No. PCT/CN2017/093658.
(Continued)

*Primary Examiner* — Abdul-Samad A Adediran
(74) *Attorney, Agent, or Firm* — Kinney & Lange, P.A.

(57) ABSTRACT

The present disclosure provides a sub-pixel unit and a method of controlling the same, a pixel unit, an array substrate, and a display device. In one embodiment, a sub-pixel unit includes: at least two subpixels. Each of the at least two subpixels includes: a first electrode; a second electrode; and a liquid crystal layer controlled by a voltage between the first electrode and the second electrode; at least one of the first electrode and the second electrode is a slit electrode. The two subpixels have different initial twist angles, and the initial twist angle is an included angle between a direction of a slit of the slit electrode and a direction where major axes of liquid crystal molecules are oriented when the liquid crystal layer is in an unpowered state, in the respective subpixel.

16 Claims, 5 Drawing Sheets

(51) Int. Cl.
  *G02F 1/1337* (2006.01)
  *G02F 1/1362* (2006.01)
(52) U.S. Cl.
  CPC ..... *G02F 1/134363* (2013.01); *G09G 3/3637* (2013.01); *G09G 3/3655* (2013.01); *G02F 1/13624* (2013.01); *G02F 2001/134345* (2013.01); *G02F 2001/134372* (2013.01); *G09G 2300/0443* (2013.01); *G09G 2300/0452* (2013.01); *G09G 2320/0626* (2013.01); *G09G 2330/021* (2013.01)
(58) Field of Classification Search
  USPC .................................. 345/92, 690; 349/114
  See application file for complete search history.

(56) References Cited

U.S. PATENT DOCUMENTS

| | | | |
|---|---|---|---|
| 2003/0117016 A1 | 6/2003 | Ukigaya | |
| 2006/0268206 A1* | 11/2006 | Nishimura | G02F 1/133555 349/114 |
| 2008/0204640 A1* | 8/2008 | Wada | G02F 1/133555 349/114 |
| 2012/0133683 A1* | 5/2012 | Goden | G09G 3/3233 345/690 |
| 2013/0069855 A1* | 3/2013 | Nakanishi | G09G 3/3655 345/92 |
| 2013/0120680 A1 | 5/2013 | Sun | |
| 2013/0293822 A1 | 11/2013 | Chung et al. | |
| 2016/0216566 A1* | 7/2016 | Park | G02F 1/133753 |
| 2017/0160584 A1 | 6/2017 | Song et al. | |

FOREIGN PATENT DOCUMENTS

| | | |
|---|---|---|
| CN | 202583658 U | 12/2012 |
| CN | 103529613 A | 1/2014 |
| CN | 103926756 A | 7/2014 |
| CN | 105093723 A | 11/2015 |
| CN | 105632434 A | 6/2016 |
| CN | 105759516 A | 7/2016 |
| CN | 205581478 U | 9/2016 |

OTHER PUBLICATIONS

First Chinese Office Action dated Feb. 10, 2020, received for corresponding Chinese Application No. 201710017676.5, 20 pages.

* cited by examiner

SUB-PIXEL UNIT AND METHOD OF CONTROLLING THE SAME, PIXEL UNIT, ARRAY SUBSTRATE, DISPLAY DEVICE

CROSS-REFERENCE TO RELATED APPLICATION

This application is a 371 National Stage application of International Application No. PCT/CN2017/093658, with an international filing date of Jul. 20, 2017, which has not yet published, and which claims priority to Chinese Patent Application No. 201710017676.5 filed on Jan. 10, 2017 in the State Intellectual Property Office of China, the disclosure of which are hereby incorporated by reference in their entirety.

TECHNICAL FIELD

The present disclosure relates to the field of liquid crystal display technology, and particularly, to a sub-pixel unit and a method of controlling the same, a pixel unit, an array substrate, a display device.

BACKGROUND

Currently, in the field of Thin Film Transistor-Liquid Crystal Display (TFT-LCD), IPS (In-Plane Switching) and FFS (Fringe Field Switching) modes are used more and more widely due to their advantages of wide visual angle, high transmittance, fast response and the like.

Regarding a liquid crystal display panel, transmittance $T_r$ and driving voltage $V_{op}$ are important parameters which affect performance and competitiveness of products. Higher transmittance indicates that the backlight brightness is lower or the power consumption is lower, while higher driving voltage indicates that power consumption of the liquid crystal display panel is higher.

SUMMARY

According to an aspect of the present disclosure, there is provided a sub-pixel unit. The sub-pixel unit comprises: at least two subpixels; each of the at least two subpixels comprises: a first electrode; a second electrode; and a liquid crystal layer controlled by a voltage between the first electrode and the second electrode; at least one of the first electrode and the second electrode is a slit electrode; and the at least two subpixels have different initial twist angles, and the initial twist angle is an included angle between a direction of a slit of the slit electrode and a direction where major axes of liquid crystal molecules are oriented when the liquid crystal layer is in a unpowered state, in the respective subpixel.

In at least some embodiments, in the above sub-pixel unit, the at least two subpixels comprise: a first subpixel and a second subpixel; wherein, the first subpixel has an initial twist angle of $\theta_1$; the second subpixel has an initial twist angle of $\theta_2$; and, both the $\theta_1$ and the $\theta_2$ are less than 15°.

In at least some embodiments, in the above sub-pixel unit, the $\theta_1$ and the $\theta_2$ are two different ones selected from a group consisting of 5°, 7°, 11°.

According to another aspect of the present disclosure, there is also provided a pixel unit. The pixel unit comprises: several sub-pixel units, and at least one of the several sub-pixel units is any one of the abovementioned sub-pixel unit.

In at least some embodiments, in the above pixel unit, the several sub-pixel units comprise: a red sub-pixel unit, a green sub-pixel unit and a blue sub-pixel unit; the red sub-pixel unit comprises: a first red subpixel and a second red subpixel having different initial twist angles; the green sub-pixel unit comprises: a first green subpixel and a second green subpixel having different initial twist angles; and the blue sub-pixel unit comprises: a first blue subpixel and a second blue subpixel having different initial twist angles.

In at least some embodiments, in the above pixel unit, the first red subpixel, the first green subpixel and the first blue subpixel have the same initial twist angle of $\theta_1$; and the second red subpixel, the second green subpixel and the second blue subpixel have the same initial twist angle of $\theta_2$.

In at least some embodiments, in the above pixel unit, two subpixels of the same sub-pixel unit are arranged in a first direction; and the same type of subpixels of different sub-pixel units are arranged sequentially in a second direction that is neither coincident with nor parallel to the first direction.

In at least some embodiments, in the above pixel unit, two subpixels of the same sub-pixel unit are arranged in a first direction; and the first subpixels and the second subpixels of different sub-pixel units are arranged alternately in a second direction that is neither coincident with nor parallel to the first direction.

In at least some embodiments, in the above pixel unit, two subpixels of the same sub-pixel unit are arranged in a first direction; and the first subpixels and the second subpixels of different sub-pixel units are arranged randomly in a second direction that is neither coincident with nor parallel to the first direction.

According to yet another aspect of the present disclosure, there is also provided an array substrate. The array substrate comprises: a base substrate; and an array of pixel units disposed on the base substrate and comprising a plurality of pixel units arranged in array; at least one pixel unit of the plurality of pixel units is any one of the abovementioned pixel unit.

In at least some embodiments, the array substrate further comprises: gate lines and data lines formed on the base substrate; wherein, in the at least one pixel unit, two subpixels of the same sub-pixel unit share the same gate line and are controlled by different data lines.

In at least some embodiments, in the array substrate, at least one pixel unit of the plurality of pixel units in the array of pixel units is any one of the abovementioned pixel unit; the array substrate further comprises: gate lines and data lines formed on the base substrate; wherein, the first direction is along a direction of the data lines and the second direction is along a direction of the gate lines.

In at least some embodiments, in the array substrate, the array substrate is an array substrate with an IPS mode or an FFS mode; wherein the subpixel of the pixel unit comprises: a pixel electrode and a common electrode separated by an insulation layer; the first electrode is one of the pixel electrode and the common electrode, and the second electrode is the other of the pixel electrode and the common electrode.

According to still another aspect of the present disclosure, there is also provided a display device. The display device comprises: any one of the abovementioned array substrate.

According to still yet another aspect of the present disclosure, there is also provided a method of controlling any one of the abovementioned sub-pixel unit. The method comprises: a step A of, acquiring a sub-pixel unit required display luminance value; and a step B of, selecting a corresponding working mode from a group of arrangements of the at least two subpixels, according to the sub-pixel unit required display luminance value.

In at least some embodiments, in the method, the at least two subpixels comprises: a first subpixel and a second subpixel, the first subpixel has an initial twist angle of $\theta_1$, the second subpixel has an initial twist angle of $\theta_2$, and, $\theta_1 > \theta_2$; wherein, the step B comprises: a sub-step B1 of, judging, if $\Delta < \Delta 2$, that the sub-pixel unit requires to display in a low luminance, and controlling only the first subpixel of the sub-pixel unit to work; a sub-step B2 of, judging, if $\Delta 2 \leq \Delta < \Delta 1$, that the sub-pixel unit requires to display in a medium luminance, and controlling only the second sub-pixel of the sub-pixel unit to work; and, a sub-step B3 of, judging, if $\Delta \geq \Delta 1$, that the sub-pixel unit requires to display in a high luminance, and controlling the first subpixel and the second subpixel of the sub-pixel unit to work simultaneously; in which, $\Delta$ is the sub-pixel unit required display luminance value, $\Delta 1$ is a first luminance threshold, $\Delta 2$ is a second luminance threshold, and $\Delta 1 > \Delta 2$.

DETAILED DESCRIPTION OF THE EMBODIMENTS

Figure 1:
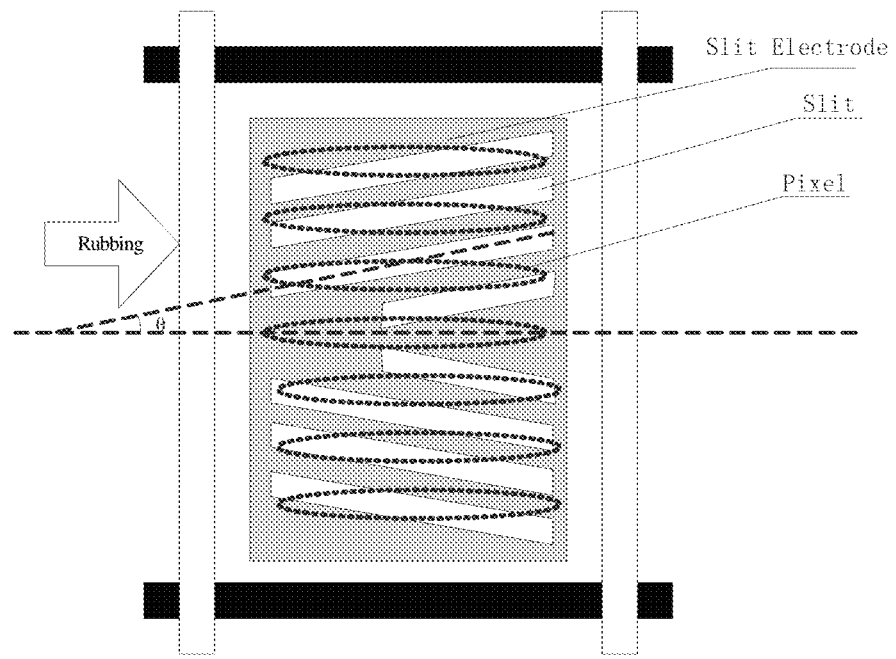
FIG. 1 is a schematic view showing a sub-pixel unit which adopts a pixel structure having two symmetrical upper and lower domains and a pixel electrode of slit design.

FIG. 1 is a schematic view showing a sub-pixel unit which adopts a pixel structure having two symmetrical upper and lower domains and a pixel electrode of slit design. As shown in FIG. 1, the sub-pixel unit adopts a pixel structure having two symmetrical upper and lower domains and a pixel electrode of slit design. For this sub-pixel unit, rubbing occurs in a horizontal direction, to induce liquid crystal molecules to align in the horizontal direction. Here, an included angle between a direction of a slit of the slit electrode and a direction where major axes of liquid crystal molecules are oriented in a unpowered state is named as initial twist angle. Based on different initial twist angles, a driving voltage and transmittance relationship curve (V-T curve) of the pixel is different.

Figure 2:
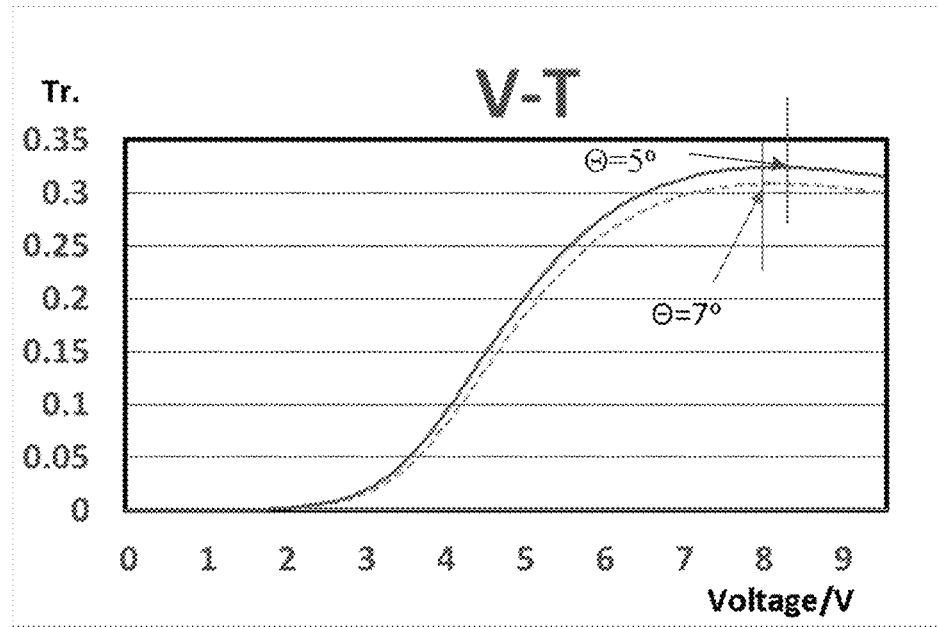
FIG. 2 is a simulated diagram showing a relationship between a transmittance $T_r$ and a driving voltage $V_{op}$ of the sub-pixel unit shown in FIG. 1.

FIG. 2 is a simulated diagram showing a relationship between a transmittance $T_r$ and a driving voltage $V_{op}$ of the sub-pixel unit shown in FIG. 1. As shown in FIG. 2, in a pixel having an initial twist angle of 5°, the liquid crystal molecule has a higher transmittance $T_r$ and a higher driving voltage $V_{op}$, as well as higher luminance and power consumption. In a pixel having an initial twist angle of 7°, it has a lower transmittance $T_r$ and a lower driving voltage $V_{op}$, as well as lower luminance and power consumption.

In an existing TFT-LCD liquid crystal display panel, the double domain pixel structure has only one slit angle design of the slit electrode, which only corresponds to one voltage and transmittance (V-T) curve of the pixel. To meet different requirements of luminance and power consumption, it responses relatively slowly, so the applicability and usable range are greatly reduced.

Currently, an aim of designing a liquid crystal display panel is to pursue high transmittance, but the problem is that it inevitably increases power consumption. During actual working process of the liquid crystal display panel, in many cases, the pixels are required only to display in low gray scale and in low luminance, while more attention is paid on requirements of power consumption and energy savings. However, at present, a liquid crystal panel with a normal design of slit electrode and initial twist angle often has a single function and cannot achieve management and control of multi-level, multi-luminance and different power consumption requirements.

The present disclosure proposes a novel design of sub-pixel unit, which can be compatible with the requirements of high luminance and high power consumption as well as low luminance and low power consumption. Based on the design scheme of the sub-pixel unit, the present disclosure also provides a sub-pixel unit and a method of controlling the same, a pixel unit, an array substrate, and a display device.

In order to provide a more clear understanding of objects, technique solutions and advantages of the present disclosure, the present disclosure will be further described hereinafter in detail in conjunction with specific embodiments and with reference to the attached drawings.

According to one aspect of the present disclosure, there is provided a sub-pixel unit. The sub-pixel unit comprises: at least two subpixels. Each of the subpixels comprises: a first electrode; a second electrode; and a liquid crystal layer controlled by a voltage between the first electrode and the second electrode. At least one of the first electrode and the second electrode is a slit electrode. The two subpixels have different initial twist angles, and the initial twist angle is an included angle between a direction of a slit of the slit electrode and a direction where major axes of liquid crystal molecules are oriented when the liquid crystal layer is in a unpowered state, in the respective subpixel.

It should be note that, "initial twist angle" of a subpixel indicates: initial twist angle of liquid crystal molecules contained in a liquid crystal layer of the subpixel, more specifically, it indicates: in the subpixel, an included angle between a direction of a slit of the slit electrode and a direction where major axes of liquid crystal molecules are oriented when the liquid crystal layer is in a unpowered state.

For one pixel unit, it typically comprises: a red sub-pixel unit, a green sub-pixel unit and a blue sub-pixel unit. For some types of pixel units, the pixel unit may further comprise: a white sub-pixel unit. The above sub-pixel unit may be: any one of the red sub-pixel unit, the green sub-pixel unit, the blue sub-pixel unit and the white sub-pixel unit, or else may be other types of sub-pixel units. Moreover, the sub-pixel unit may comprise two subpixels, or else may comprise three, four, five or more subpixels, as long as two of these subpixels have different initial twist angles, all of which are within the scope of the present disclosure.

For the first electrode and the second electrode, they indicate electrode layers which are located on either side of the liquid crystal layer and for supplying the liquid crystal layer with control voltage. Types, materials and the likes of the first electrode and the second electrode are not limited in the embodiments of the present disclosure. For the slit electrode and the pixel layer and the likes, there are general meanings for them in the art, which is not to be discussed herein. The slit electrode may be provided in the first electrode, or may be provided in the second electrode.

Figure 3:
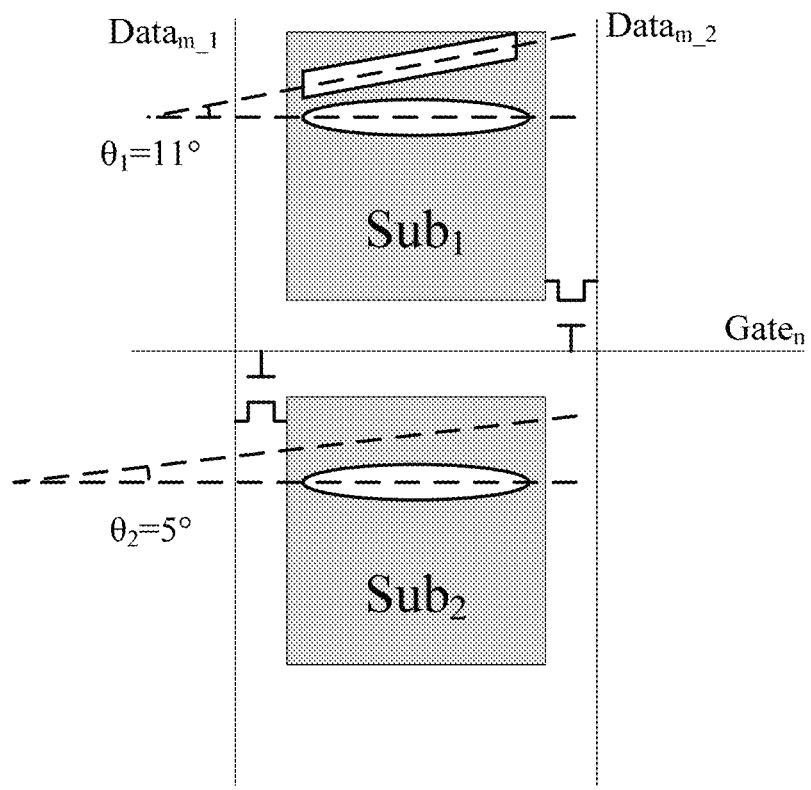
FIG. 3 is a structural schematic view showing a sub-pixel unit according to an embodiment of the present disclosure.

In an exemplary embodiment of the present disclosure, there is provided a sub-pixel unit. FIG. 3 is a structural schematic view showing a sub-pixel unit according to an embodiment of the present disclosure. As shown in FIG. 3, in this embodiment, the sub-pixel unit comprises a first subpixel $Sub_1$ and a second subpixel $Sub_2$. The first subpixel $Sub_1$ has an initial twist angle of $\theta_1$; the second subpixel $Sub_2$ has an initial twist angle of $\theta_2$; $\theta_1 \neq \theta_2$.

Taking light efficiency of the liquid crystal layer and transmittance of the liquid crystal panel into consideration, the initial twist angle of the subpixel is preferably less than 15°. Typically, the initial twist angles of the two subpixels are two different ones selected from a group consisting of 5°, 7°, and 11°. For a sub-pixel unit comprising a first subpixel and a second subpixel, values of the initial twist angle may be as follows.

The first subpixel has an initial twist angle $\theta_1$ of 5°, and the second subpixel has an initial twist angle $\theta_2$ of 7°.

The first subpixel has an initial twist angle $\theta_1$ of 7°, and the second subpixel has an initial twist angle $\theta_2$ of 11°.

The first subpixel has an initial twist angle $\theta_1$ of 5°, and the second subpixel has an initial twist angle $\theta_2$ of 11°.

In this embodiment, the initial twist angle $\theta_1$ of the first subpixel $Sub_1$ is 11°, and the initial twist angle $\theta_2$ of the second subpixel $Sub_2$ is 5°. The sub-pixel unit can be operated in one of the following four working modes.

In a first working mode, the first subpixel $Sub_1$ works while the second subpixel $Sub_2$ does not work, in this case, the transmittance is relatively low and the power consumption is low.

In a second working mode, the first subpixel $Sub_1$ does not work while the second subpixel $Sub_2$ works, in this case, the transmittance increases and the power consumption increases.

In a third working mode, the first subpixel $Sub_1$ and the second subpixel $Sub_2$ work simultaneously, in this case, the transmittance reaches a maximum, and, it displays in a maximum luminance, so the power consumption also reaches a maximum.

In a fourth working mode, both the first subpixel $Sub_1$ and the second subpixel $Sub_2$ do not work, in this case, the sub-pixel unit is completely opaque.

Please referring to FIG. 3, for the sub-pixel unit according to this embodiment, the first subpixel $Sub_1$ and the second subpixel $Sub_2$ share one gate line $Gate_n$ to control gate signal of a corresponding thin-film transistor, and adopt two data lines $Data_{m\_1}$ and $Data_{m\_2}$ to provide data signals, respectively, to achieve independent controls of the first subpixel and the second subpixel.

On the basis of the abovementioned sub-pixel unit, the present disclosure also provides a method of controlling a sub-pixel unit. In this method, the first subpixel and the second subpixel are controlled independently and respectively in accordance with sub-pixel unit required display luminance value.

Figure 4:
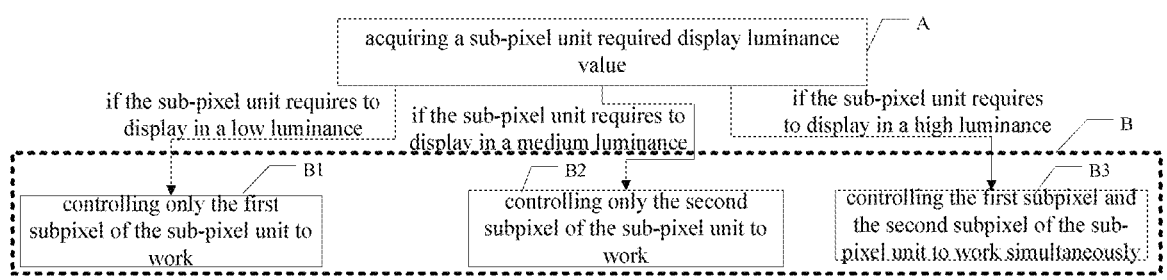
FIG. 4 is a flow diagram showing a method of controlling the sub-pixel unit shown in FIG. 3.

FIG. 4 is a flow diagram showing a method of controlling the sub-pixel unit shown in FIG. 3. Please referring to FIG. 4, according to this embodiment, the method of controlling the sub-pixel unit comprises:

a step A of, acquiring a sub-pixel unit required display luminance value $\Delta$; and a step B of, selecting a corresponding working mode from a group of arrangements of the at least two subpixels, according to the sub-pixel unit required display luminance value $\Delta$.

Specifically, a first luminance threshold $\Delta 1$ and a second luminance threshold $\Delta 2$ are preset, and $\Delta 1 > \Delta 2$, the step B comprises the following.

There is a sub-step B1 of, judging, if $\Delta < \Delta 2$, that the sub-pixel unit requires to display in a low luminance, and controlling only the first subpixel of the sub-pixel unit to work.

Since the initial twist angle in the first subpixel is relatively great, the transmittance is relatively low, at the same time, the power consumption for driving the panel is relatively low, which achieves energy saving.

There is a sub-step B2 of, judging, if $\Delta 2 \leq \Delta < \Delta 1$, that the sub-pixel unit requires to display in a medium luminance, and controlling only the second subpixel of the sub-pixel unit to work.

Since the initial twist angle in the second subpixel is relatively small, the transmittance increases, at the same time, the power consumption for driving the panel increases slightly.

There is a sub-step B3 of, judging, if $\Delta \geq \Delta 1$, that the sub-pixel unit requires to display in a high luminance, and controlling the first subpixel and the second subpixel of the sub-pixel unit to work simultaneously.

In this case, transmittance of the sub-pixel unit as a whole greatly increases, which achieves a high luminance displaying.

The above merely illustrates one method of controlling the sub-pixel unit, as an example, however, those skilled in the art can envisage other types of controlling methods based on the above description, and it is not discussed in detail herein.

Thus it can be see, in this embodiment, the sub-pixel unit is designed to include two subpixels having different initial twist angles, and the two subpixels are controlled respectively, which can be compatible with the requirements of high luminance and high power consumption as well as low luminance and low power consumption so that the liquid crystal display device has wider applicability and usable range.

On the basis of the abovementioned sub-pixel unit, according to another aspect of the present disclosure, there is also provided a pixel unit. The pixel unit comprises several sub-pixel units, and at least one of the several sub-pixel units is the aforementioned sub-pixel unit provided according to embodiments of the present disclosure.

Figure 5:
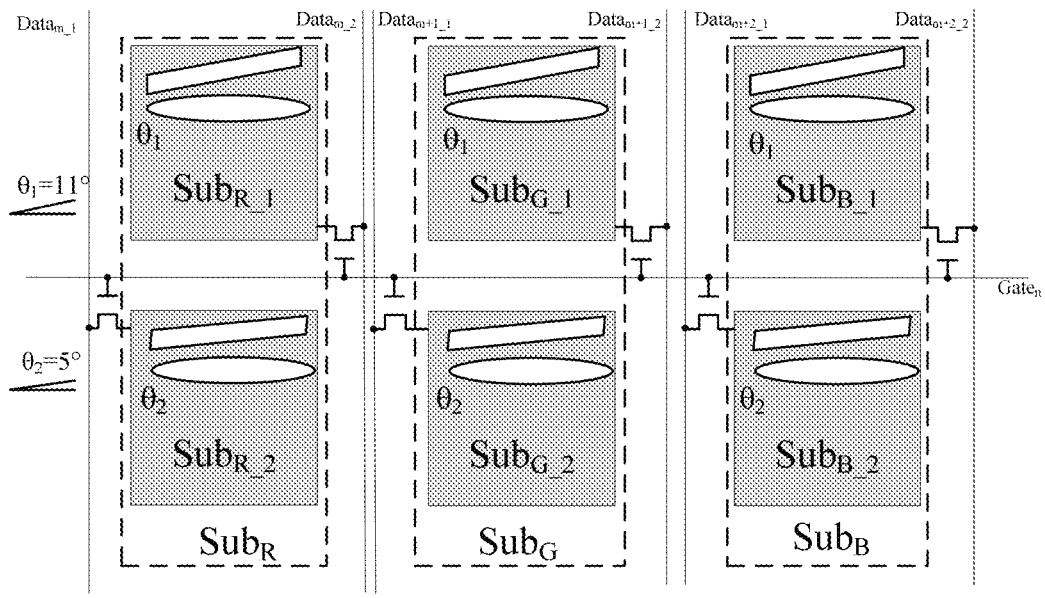
FIG. 5 is a structural schematic view showing a pixel unit according to an embodiment of the present disclosure.

In an exemplary embodiment of the present disclosure, there is provided a pixel unit. FIG. 5 is a structural schematic view showing a pixel unit according to an embodiment of the present disclosure. As shown in FIG. 5, in this embodiment, the pixel unit comprises: a red sub-pixel unit $Sub_R$, a green sub-pixel unit $Sub_G$ and a blue sub-pixel unit $Sub_B$. The three sub-pixel units are the ones according to the abovementioned embodiments. Namely, the red sub-pixel unit $Sub_R$ comprises: the first red subpixel $Sub_{R\_1}$ and the second red subpixel $Sub_{R\_2}$; the green sub-pixel unit $Sub_G$ comprises: the first green subpixel $Sub_{G\_1}$ and the second green subpixel $Sub_{G\_2}$; and the blue sub-pixel unit $Sub_B$ comprises: the first blue subpixel $Sub_{B\_1}$ and the second blue subpixel $Sub_{B\_2}$.

The first red subpixel $Sub_{R\_1}$ of the red sub-pixel unit, the first green subpixel $Sub_{G\_1}$ of the green sub-pixel unit and the first blue subpixel $Sub_{B\_1}$ of the blue sub-pixel unit have the same initial twist angle, of $\theta_1=11°$. The second red subpixel $Sub_{R\_2}$ of the red sub-pixel unit, the second green subpixel $Sub_{G\_2}$ of the green sub-pixel unit and the second blue subpixel $Sub_{B\_2}$ of the blue sub-pixel unit have the same initial twist angle, of $\theta_2=5°$.

It can be understood by those skilled in the art that, in the present embodiment, the description is implemented by taking a pixel unit including the red sub-pixel unit $Sub_R$, the green sub-pixel unit $Sub_G$ and the blue sub-pixel unit $Sub_B$ as an example, however, for the pixel unit consisted of other types of sub-pixel units, as long as it is satisfied that one of the sub-pixel units includes two subpixels having different initial twist angles, all of which are within the scope of the present disclosure;

in the present embodiment, three sub-pixel units of the pixel unit each is the sub-pixel unit including two subpixels having different initial twist angles, however, the present disclosure can also be implemented if only some or even one of the sub-pixel units meets this condition;

in the present embodiment, the first subpixels of the three sub-pixel units have the same initial twist angle and the second subpixels have the same initial twist angle, which is only a preferred implementation of the present disclosure, and it is not limited by the present disclosure that first (second) initial twist angles of the sub-pixel units are the same, in other embodiments of the present disclosure, first (second) initial twist angles of different sub-pixel units may be set to be different, which will not affect implementation of the present disclosure;

for the initial twist angles $\theta_1$ and $\theta_2$, those skilled in the art can set them according to requirements, and they are not limited to $\theta_1=11°$ and $\theta_2=5°$ as mentioned above.

Please see FIG. 5, for each sub-pixel unit of the pixel unit according to the present embodiment, its two subpixels share one gate line (Gate) to control gate signal of a corresponding thin-film transistor, and adopt two data lines (Data) to provide data signals, respectively, to achieve independent controls of the first subpixel and the second subpixel.

Green sub-pixel unit $Sub_G$ is taken as an example, its first green subpixel $Sub_{G\_1}$ and second green subpixel $Sub_{G\_2}$ share a gate line $Gate_n$, and the data signals are provided by the data lines $Data_{m+1\_1}$ and $Data_{m+1\_2}$, respectively.

Please continue to see FIG. 5, in the pixel unit according to the present embodiment, two subpixels of the same sub-pixel unit are arranged in a direction of data lines, and first (second) subpixels of the sub-pixel units are arranged sequentially in the same row along a direction of gate lines. It should be understood by those skilled in the art that, the abovementioned direction of data lines and the direction of gate lines are presented as a particular case, it is merely required that the two directions are neither coincident with nor parallel to each other.

Figure 6:
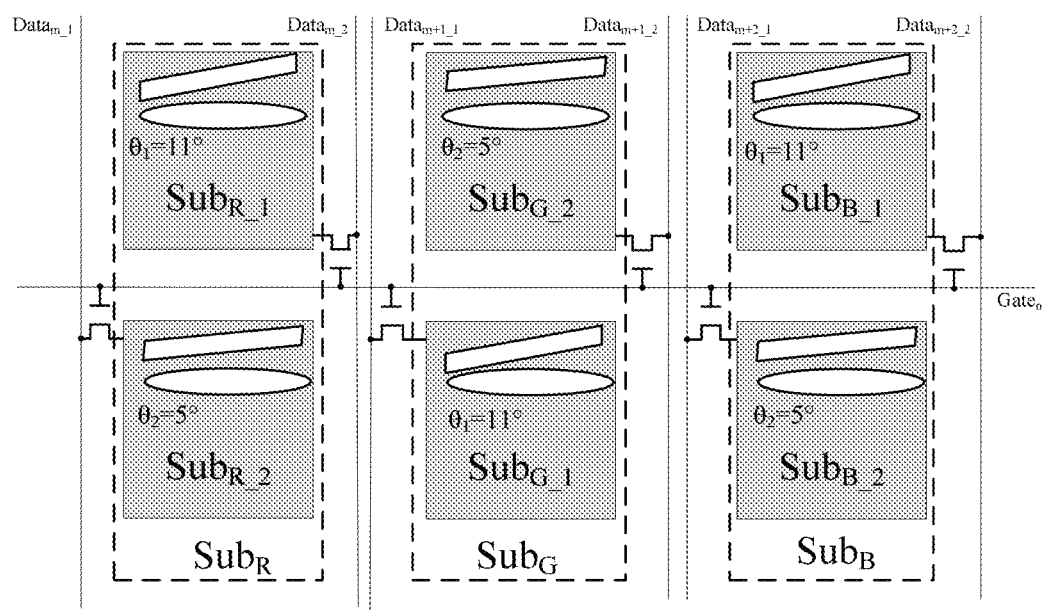
FIG. 6 is a schematic view showing a modification of the pixel unit shown in FIG. 5.

FIG. 6 is a schematic view showing a modification of the pixel unit shown in FIG. 5. In the pixel unit shown in FIG. 6, the first subpixels and the second subpixels of different sub-pixel units are arranged alternately in the same row along the direction of gate lines. In addition, in another modification of the pixel unit, the first subpixels and the second subpixels of different sub-pixel units are arranged randomly in the same row along the direction of gate lines. The two modifications can implement the present disclosure as the pixel unit shown in FIG. 4.

The pixel unit according to the present embodiment has all advantages of the sub-pixel unit according to the abovementioned embodiments, and they are not discussed repeatedly herein.

According to another aspect of the present disclosure, there is also provided an array substrate. The array substrate comprises: a base substrate; gate lines and data lines formed on the base substrate; and an array of pixel units, wherein, the array of pixel units is disposed on the base substrate and comprises a plurality of pixel units arranged in array. In the embodiments, the pixel unit is the abovementioned pixel unit.

Hereinafter, in order to facilitate the description, a direction of data lines in the array substrate is defined as a first direction, and a direction of gate lines is defined as a second direction.

It should be explained that, in the present embodiment, it is defined that, the first direction is the direction of data lines, the second direction is the direction of gate lines, and the first direction and the second direction are perpendicular to each other, however, it is limited to this. In other embodiments of the present disclosure, the first direction is not necessarily the direction of data line and the second direction is not necessarily the direction of gate lines, as long as it is satisfied that the first direction and the second direction are neither coincident with nor parallel to each other.

Figure 7:
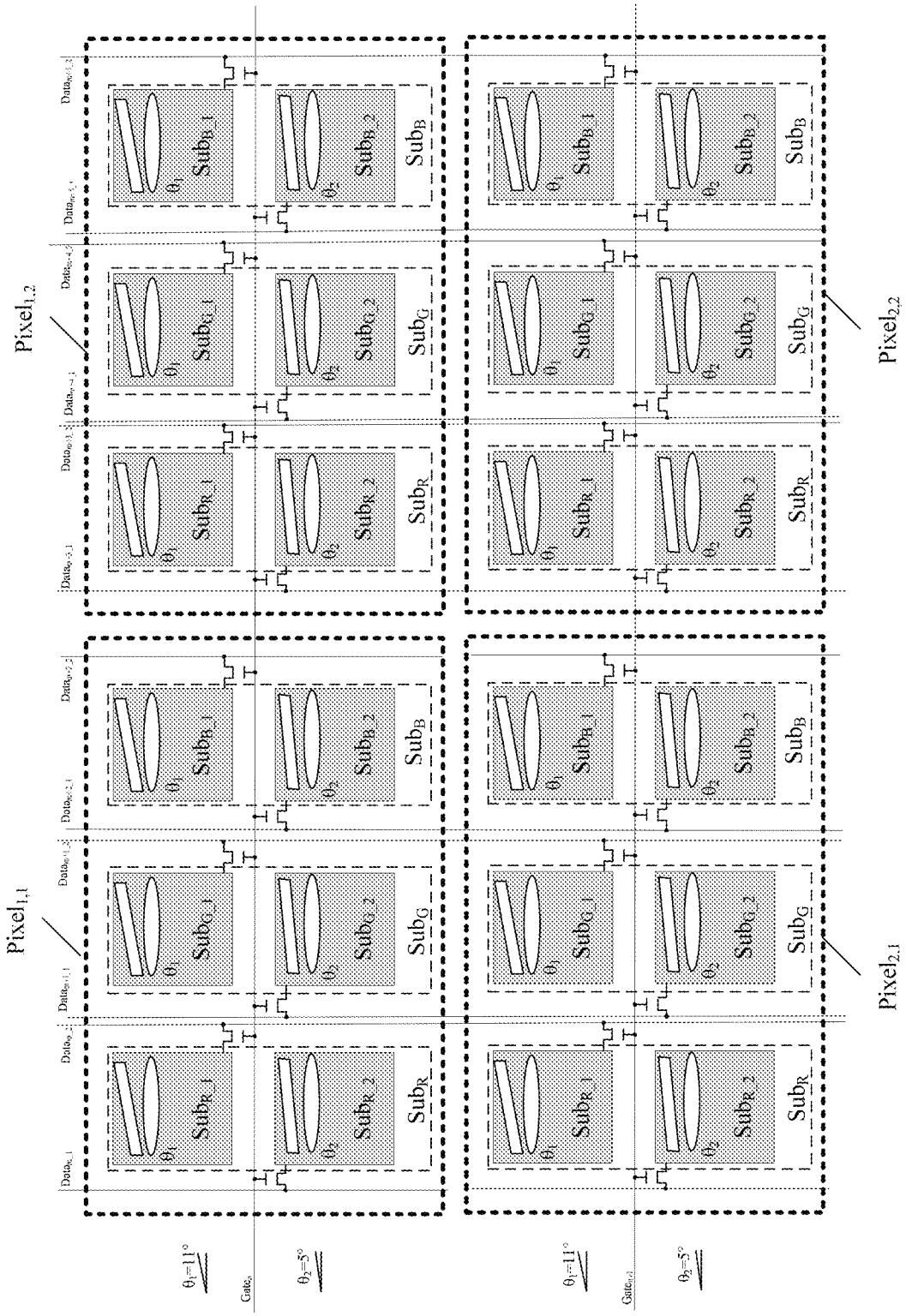
FIG. 7 is a schematic view showing an array of pixel units in an array substrate according to an embodiment of the present disclosure.

On the basis of the pixel unit shown in FIG. 5, according to an embodiment of the present disclosure, there is provided an array substrate. FIG. 7 is a schematic view showing an array of pixel units in an array substrate according to an embodiment of the present disclosure. In the array of pixel units as shown in FIG. 7, an arrangement of red R, green G, and blue B stripes is taken as an example, which presents four pixel units, $Pixel_{1,1}$, $Pixel_{1,2}$, $Pixel_{2,1}$ and $Pixel_{2,2}$. Each pixel unit comprises: a red sub-pixel unit $Sub_R$, a green sub-pixel unit $Sub_G$ and a blue sub-pixel unit $Sub_B$. For any one of the red sub-pixel unit $Sub_R$, the green sub-pixel unit $Sub_G$ and the blue sub-pixel unit $Sub_B$, it comprises: a first subpixel and a second subpixel adjacent to each other and arranged in the first direction. And, the first subpixels of the sub-pixel units have the same initial twist angle, of $\theta_1=11°$, and the second subpixels of the sub-pixel units have the same initial twist angle, of $\theta_2=5°$.

In the second direction, the first subpixels of different sub-pixel units are arranged sequentially, or the second subpixels of different sub-pixel units are arranged sequentially. For example, it is shown in FIG. 7 as follows.

In a first row, first red subpixels $Sub_{R\_1}$ of the red sub-pixel units, first green subpixels $Sub_{G\_1}$ of the green sub-pixel units, and first blue subpixels $Sub_{B\_1}$ of the blue sub-pixel units are arranged sequentially and circularly.

In a second row, second red subpixels $Sub_{R\_2}$ of the red sub-pixel units, second green subpixels $Sub_{G\_2}$ of the green sub-pixel units, and second blue subpixels $Sub_{B\_2}$ of the blue sub-pixel units are arranged sequentially and circularly.

Deduced from the above by analogy, the array of pixel units in a display region of the array substrate according to the present embodiment is formed.

Please continue to see FIG. 5 and FIG. 7, for one sub-pixel unit, its two subpixels share one gate line (Gate) to control gate signal of a corresponding thin-film transistor, and adopt two data lines (Data) to provide data signals, respectively, to achieve independent controls of the first subpixel and the second subpixel.

For example, for the red sub-pixel unit $Sub_R$ of the pixel unit $Pixel_{1,1}$ in the top left, it comprises: a first red subpixel $Sub_{R\_1}$ and a second red subpixel $Sub_{R\_2}$, which are arranged in the direction of data lines. The first red subpixel $Sub_{R\_1}$ and second red subpixel $Sub_{R\_2}$ share one gate line $Gate_n$ to control gate signal of a corresponding thin-film transistor, while, the first red subpixel $Sub_{R\_1}$ is provided with data signal through the data line $Data_{m\_1}$, and the second red subpixel $Sub_{R\_2}$ is provided with data signal through the data line $Data_{m\_2}$.

The array substrate according to the present embodiment may be an array substrate with an IPS mode or an FFS mode. In this case, each subpixel comprises: a pixel electrode and a common electrode separated by an insulation layer; one of the pixel electrode and the common electrode is a slit electrode. Preferably, the pixel electrode serves as the slit electrode. For an in-plane display technology, generally, an arrangement in which two electrodes both are slit electrodes is not adopted.

By adopting the arrangement of the subpixels according to the present embodiment, which is simple in arrangement rule, the manufacturing process is simplified accordingly and the signal control is eased. However, it should be noted that, once voltage in some gate line is not stable, all the subpixels on this gate line will be adversely affected, so that a situation where luminance in a whole line in this position is either relatively high or relatively low occurs in the display region, thereby adversely affecting the display effect.

On the basis of the pixel unit shown in FIG. 6, according to another embodiment of the present disclosure, there is provided an array substrate. The present embodiment is similar to the above embodiment of the array substrate, excepting in that, in the same row within the display region, the first subpixels and the second subpixels are arranged alternately.

Figure 8:
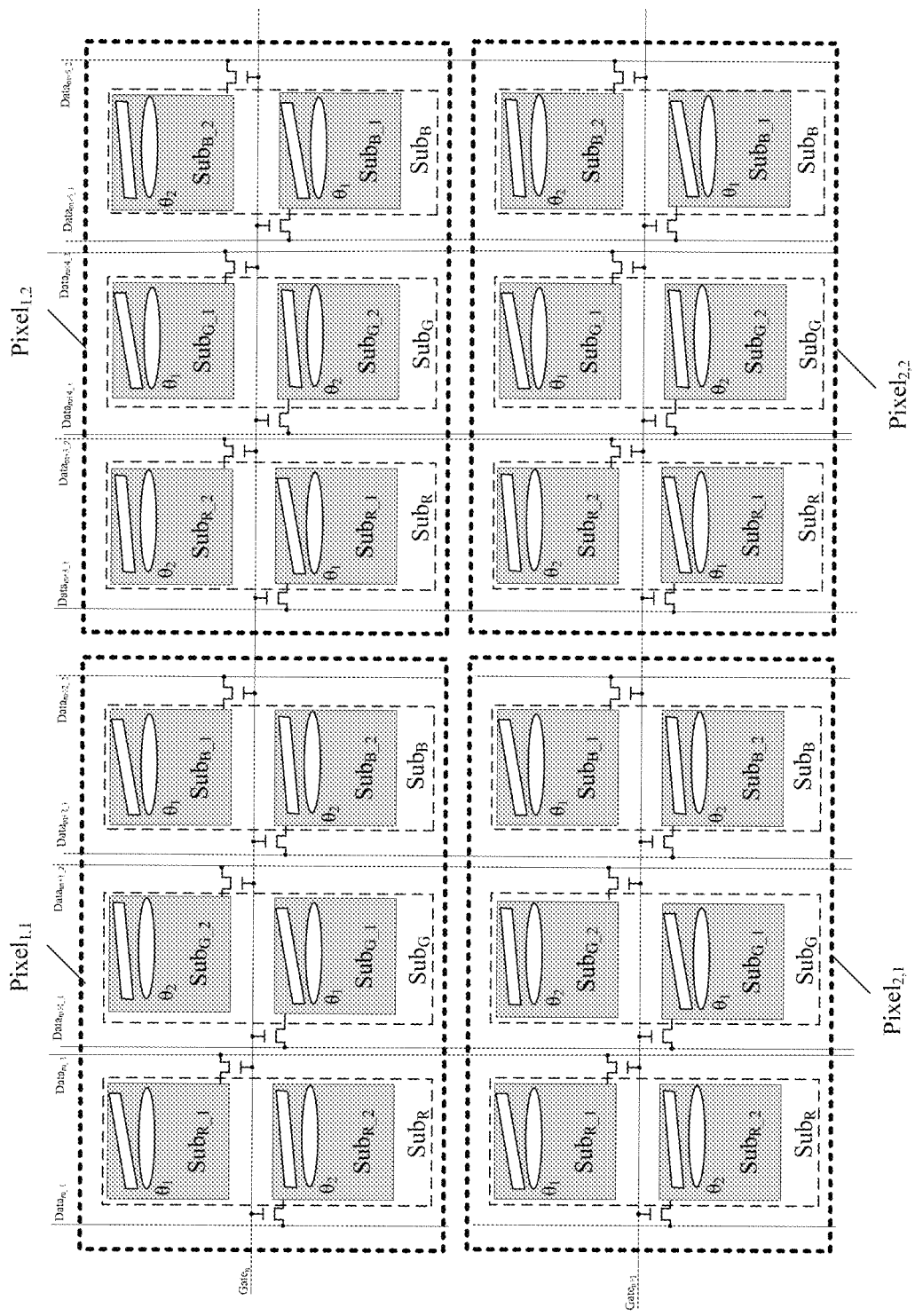
FIG. 8 is a schematic view showing an array of pixel units in an array substrate according to another embodiment of the present disclosure.

FIG. 8 is a schematic view showing an array of pixel units in an array substrate according to another embodiment of the present disclosure. In the array of pixel units as shown in FIG. 8, an arrangement of red R, green G, and blue B stripes is also taken as an example. The red R, green G, and blue B sub-pixel units in the array substrate are specifically divided into two kinds of subpixels: first subpixels and second subpixels. In the same kind of subpixels, slits of the slit electrodes have the same inclination angle. In these sub-pixel units, the first subpixels have the initial twist angle of 11°, the second subpixels have the initial twist angle of 5°, and the two in the same row are arranged alternately.

Please continue to see FIG. 8, for any one of the red sub-pixel unit $Sub_R$, the green sub-pixel unit $Sub_G$ and the blue sub-pixel unit $Sub_B$, it comprises: a first subpixel and a second subpixel adjacent to each other and arranged in the first direction. In the same row along the second direction, first subpixels and second subpixels of different sub-pixels are arranged alternately. For example, it is shown in FIG. 8 as follows.

In a first row, the first subpixel $Sub_{R\_1}$ of the red sub-pixel unit, the second subpixel $Sub_{G\_2}$ of the green sub-pixel unit, the first subpixel $Sub_{B\_1}$ of the blue sub-pixel unit, the second subpixel $Sub_{R\_2}$ of the red sub-pixel unit, the first subpixel $Sub_{G\_1}$ of the green sub-pixel unit, and the second subpixel $Sub_{B\_2}$ of the blue sub-pixel unit are arranged sequentially and circularly.

In a second row, the second subpixel $Sub_{R\_2}$ of the red sub-pixel unit, the first subpixel $Sub_{G\_1}$ of the green sub-pixel unit, the second subpixel $Sub_{B\_2}$ of the blue sub-pixel unit, the first subpixel $Sub_{R\_1}$ of the red sub-pixel unit, the second subpixel $Sub_{G\_2}$ of the green sub-pixel unit, and the first subpixel $Sub_{B\_1}$ of the blue sub-pixel unit are arranged sequentially and circularly.

Deduced from the above by analogy, the array of pixel units in a display region of the array substrate according to the present embodiment is formed.

By adopting the arrangement of the subpixels according to the present embodiment, which is relatively complicated in arrangement rule, the manufacturing process and the signal control are relatively complicated accordingly, however, the situation where luminance in the whole line is either relatively high or relatively low, occurred in the display region, addressed in the first embodiment of the array substrate can be eliminated, thereby achieving a relatively better display effect.

On the basis of a pixel unit in which first subpixels and second subpixels of different sub-pixel units are arranged randomly, there is provided an array substrate according to yet another embodiment of the present disclosure. In the array substrate according to the present embodiment, for any one of the red subpixels, the green subpixels and the blue subpixels, the first subpixel and the second subpixel are arranged in the first direction; in the second direction, the first subpixels and the second subpixels of different sub-pixels are arranged randomly, that is, in the same row of the display region, the arrangement of the first subpixels and the second subpixels is random.

By adopting the arrangement of the subpixels according to the present embodiment, which is mostly complicated in arrangement rule, the manufacturing process and the signal control are mostly complicated accordingly, however, the situation where luminance in the whole line is either relatively high or relatively low, occurred in the display region, addressed in the above embodiment of the array substrate can be eliminated completely, thereby achieving a best display effect.

According to still another aspect of the present disclosure, there is further provided a display device. The display device comprises any one of the abovementioned array substrates.

Thus it can be seen from the above that, the sub-pixel unit and the method of controlling the same, the pixel unit, the array substrate, and the display device at least have one of the following advantages.

A novel structure of sub-pixel unit is provided.

The sub-pixel unit is designed to include two subpixels having different initial twist angles, and the two subpixels are respectively controlled to achieve management and control of multi-level, multi-luminance and different power consumption requirements, so that the liquid crystal display device has wider applicability and usable range.

In the same row of effective display region of the array substrate along the second direction, first (second) subpixels of different sub-pixel units are arranged sequentially, in this case, arrangement rule is simple, the manufacturing process is simplified accordingly and the signal control is eased.

In the same row of effective display region of the array substrate along the second direction, first and second subpixels of different sub-pixel units are arranged alternately, in this case, a situation where luminance in the whole line is either relatively high or relatively low, occurred in the display region once the voltage in some gate line is not stable, can be eliminated, thereby achieving a relatively better display effect.

In the same row of effective display region of the array substrate along the second direction, first subpixels and second subpixels of different sub-pixel units are arranged randomly, in this case, a situation where luminance in the whole line is either relatively high or relatively low, occurred in the display region once the voltage in some gate line is not stable, can be eliminated completely, thereby achieving the best display effect.

To this, several embodiments of the present disclosure have been described in detail in conjunction with the attached drawings. In accordance with the above description, those skilled in the art should have a clear understanding on the sub-pixel unit and the method of controlling the same, the pixel unit, the array substrate, and the display device according to the present disclosure.

It should be noted that, all the implementations not shown or described in the drawings or the description are those known by those skilled in the art and are not described in detail. In addition, abovementioned definitions of these elements and methods are not limited to these specific configurations, forms or manners mentioned in the embodiments, and can be altered or replaced easily by those skilled in the art. For example, the number of subpixels in each sub-pixel unit may also be three, four or more;

for the initial twist angle, other suitable angles may also be selected, in addition to the three listed in this description;

for arrangement manner of the subpixels in the array substrate, those skilled in the art may envisage other arrangement manners based on the three listed in the embodiments, in addition to the three listed in the abovementioned embodiments.

Concerning the above, the present disclosure provides a pixel design and corresponding array substrate and display device, which are compatible with the display requirements of low luminance, medium luminance and high luminance, and a corresponding driving manner is adjusted accordingly, to meet power consumption requirement in different use environments. Accordingly, it can greatly improve applicability and usable range of the panel and enhance product competitiveness.

It should also be noted that, this description may provide examples of parameters that contain certain values, however, these parameters do not need to be exactly equal to corresponding values, but may be approximately the corresponding values within acceptable error tolerances or design constraints. Directional terminologies mentioned in the embodiments, for example, "upper", "lower", "front", "rear", "left", "right" and the likes are those shown in the figures, and are not intended to limit the scope of the present disclosure. In addition, unless otherwise specifically described or necessarily to occur in sequence, the order of the above steps is not limited to those listed above and may be varied or rearranged in accordance with required design. Moreover, based on considerations on design and reliability, the above embodiments may be mixed with each other or with other embodiments, that is, technical features described in different embodiments may be combined freely to form more embodiments.

It should be noted that, in the above embodiments, the word "comprise" does not exclude element(s) or step(s) which is/are not listed in the description. Elements defined by words "a/an" or "one" do not exclude a plurality of identical elements. The present disclosure can be implemented by means of hardware including several different elements or by means of computer that is suitably programmed. In a unit where several devices are listed, some of these devices can be embodied specifically by same hardware. Words such as first, second, third and the like are explained as definitions, instead of expressing or implying that there is any sequence between them.

Objects, technical solutions and advantages of the present disclosure have been further illustrated in the above specific embodiments. It should be understood that the above description is merely used to illustrate specific embodiments of the present disclosure, but not to limit the present disclosure. All of changes, equivalent alternatives, improvements, made within principles and spirit of the present disclosure, should be included within the scope of the present disclosure.

What is claimed is:

1. A pixel unit comprising several sub-pixel units, wherein:
   at least one of the several sub-pixel units comprises at least two subpixels;
   each of the at least two subpixels comprises:
     a first electrode;
     a second electrode; and
     a liquid crystal layer controlled by a voltage between the first electrode and the second electrode;
   at least one of the first electrode and the second electrode is a slit electrode;
   the at least two subpixels have different initial twist angles, and each of the initial twist angles is an included angle between a direction of a slit of the slit electrode and a direction where major axes of liquid crystal molecules are oriented when the liquid crystal layer is in an unpowered state, in a corresponding subpixel of the at least two subpixels;
   the several sub-pixel units comprise a red sub-pixel unit, a green sub-pixel unit and a blue sub-pixel unit;
   the red sub-pixel unit comprises a first red subpixel and a second red subpixel having different initial twist angles;
   the green sub-pixel unit comprises a first green subpixel and a second green subpixel having different initial twist angles;
   the blue sub-pixel unit comprises: a first blue subpixel and a second blue subpixel having different initial twist angles;
   the first red subpixel, the first green subpixel and the first blue subpixel have a same initial twist angle of $\theta_1$; and
   the second red subpixel, the second green subpixel and the second blue subpixel have a same initial twist angle of $\theta_2$.

2. The pixel unit of claim 1, wherein,
   two subpixels of each of the sub-pixel units are arranged in a first direction; and
   the first subpixels or the second subpixels of different sub-pixel units are arranged sequentially in a second direction that is neither coincident with nor parallel to the first direction.

3. The pixel unit of claim 1, wherein,
   two subpixels of each of the sub-pixel units are arranged in a first direction; and
   the first subpixels and the second subpixels of different sub-pixel units are arranged alternately in a second direction that is neither coincident with nor parallel to the first direction.

4. The pixel unit of claim 1, wherein,
   two subpixels of each of the sub-pixel units are arranged in a first direction; and
   the first subpixels and the second subpixels of different sub-pixel units are arranged randomly in a second direction that is neither coincident with nor parallel to the first direction.

5. The pixel unit of claim 1, wherein, both the $\theta_1$ and the $\theta_2$ are less than 15°.

6. The pixel unit of claim 5, wherein, the $\theta_1$ and the $\theta_2$ are two different angles selected from a group consisting of 5°, 7°, and 11°.

7. An array substrate, comprising:
   a base substrate; and
   an array of pixel units, disposed on the base substrate and comprising a plurality of pixel units arranged in array, at least one pixel unit of the plurality of pixel units being the pixel unit of claim 1.

8. The array substrate of claim 7, further comprising: gate lines and data lines formed on the base substrate;
   wherein, in the at least one pixel unit, two subpixels of each of the sub-pixel units share a same gate line and are controlled by different data lines.

9. The array substrate of claim 7, wherein, in the at least one pixel unit:
   two subpixels of each of the sub-pixel units are arranged in a first direction;
   the first subpixels or the second subpixels of different sub-pixel units are arranged sequentially in a second direction that is neither coincident or nor parallel to the first direction; and
   the array substrate further comprises gate lines and data lines formed on the base substrate;
   wherein, the first direction is along a direction of the data lines and the second direction is along a direction of the gate lines.

10. The array substrate of claim 7, wherein, the array substrate is an array substrate with an IPS mode or an FFS mode;
    wherein the sub-pixel units of the pixel unit each comprises: a pixel electrode and a common electrode separated by an insulation layer; the first electrode is one of the pixel electrode and the common electrode, and the second electrode is the other of the pixel electrode and the common electrode.

11. The array substrate of claim 7, wherein, in the at least one pixel unit,
    two subpixels of each of the sub-pixel units are arranged in a first direction;
    the first subpixels and the second subpixels of different sub-pixel units are arranged alternately in a second direction that is neither coincident with nor parallel to the first direction; and
    the array substrate further comprises gate lines and data lines formed on the base substrate;
    wherein, the first direction is along a direction of the data lines and the second direction is along a direction of the gate lines.

12. The array substrate of claim 7, wherein, in the at least one pixel unit,
    two subpixels of each of the sub-pixel units are arranged in a first direction;
    the first subpixels and the second subpixels of different sub-pixel units are arranged randomly in a second direction that is neither coincident with nor parallel to the first direction; and
    the array substrate further comprises gate lines and data lines formed on the base substrate;
    wherein, the first direction is along a direction of the data lines and the second direction is along a direction of the gate lines.

13. A display device, comprising: the array substrate of claim 7.

14. The display device of claim 13, wherein,
    the array substrate further comprises: gate lines and data lines formed on the base substrate;
    in the at least one pixel unit, two subpixels of each of the sub-pixel units share the same gate line and are controlled by different data lines.

15. The display device of claim 13, wherein,
    the array substrate further comprises: gate lines and data lines formed on the base substrate;
    wherein, a first direction is along a direction of the data lines and a second direction is along a direction of the gate lines.

16. A method of controlling a sub-pixel unit, wherein the sub-pixel unit comprises at least two subpixels; wherein, each of the at least two subpixels comprises: a first electrode; a second electrode; and a liquid crystal layer controlled by a voltage between the first electrode and the second electrode; at least one of the first electrode and the second electrode is a slit electrode; and the at least two subpixels have different initial twist angles, and each of the initial twist angles is an included angle between a direction of a slit of the slit electrode and a direction where major axes of liquid crystal molecules are oriented when the liquid crystal layer is in an unpowered state, in a corresponding subpixel of the at least two subpixels, the method comprising:
    a step A of, acquiring a display luminance value required by the sub-pixel unit; and
    a step B of, selecting a corresponding working mode from a group of arrangements of the at least two subpixels, according to the sub-pixel unit required display luminance value,
    wherein, the at least two subpixels comprise a first subpixel and a second subpixel, the first subpixel having an initial twist angle of θ1, and the second subpixel having an initial twist angle of θ2, wherein θ1>θ2; and
    wherein the step B comprises:
    a sub-step B1 of, judging, if Δ<Δ2, that the sub-pixel unit requires to display in a low luminance, and controlling only the first subpixel of the sub-pixel unit to work;
    a sub-step B2 of, judging, if Δ2≤Δ<Δ1, that the sub-pixel unit requires to display in a medium luminance, and controlling only the second subpixel of the sub-pixel unit to work; and
    a sub-step B3 of, judging, if Δ≥Δ1, that the sub-pixel unit requires to display in a high luminance, and controlling the first subpixel and the second subpixel of the sub-pixel unit to work simultaneously;
    in which, Δ is the display luminance value required by the sub-pixel unit, Δ1 is a first luminance threshold of the sub-pixel unit, Δ2 is a second luminance threshold of the sub-pixel unit, and Δ1>Δ2.

* * * * *